Figure 1:
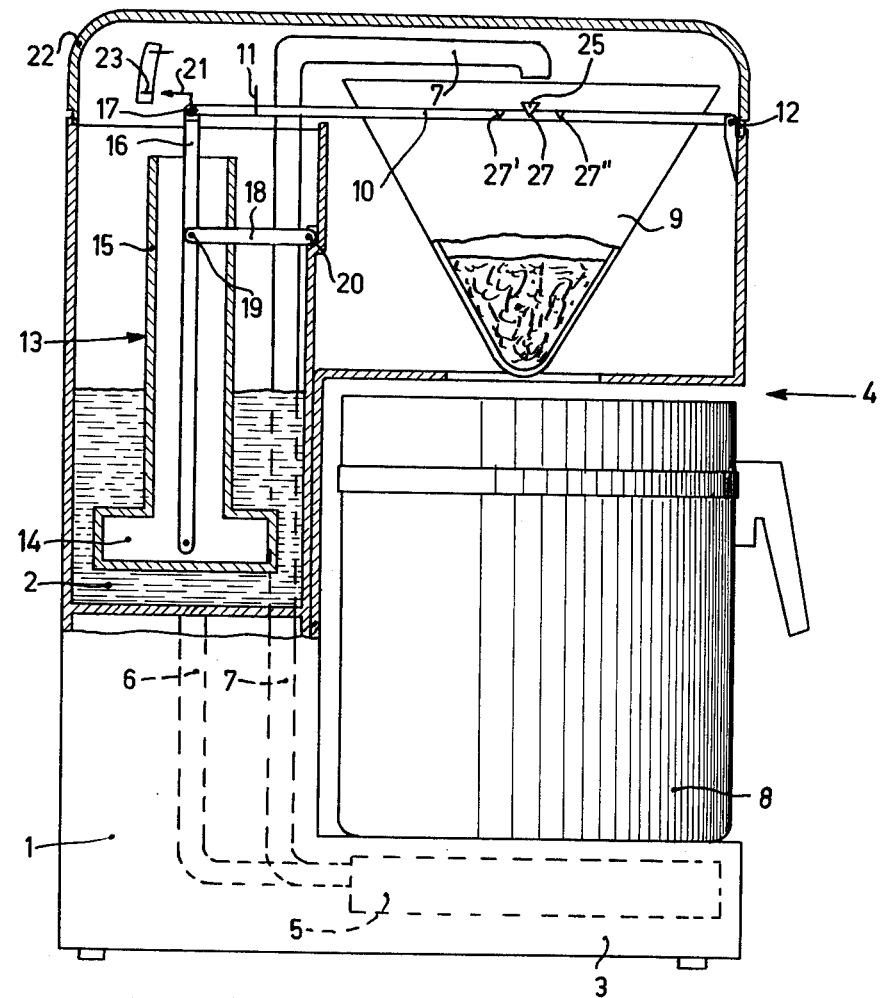

United States Patent [19]

Kats et al.

[11] 4,055,114

[45] Oct. 25, 1977

[54] APPLIANCE FOR MAKING COFFEE AND THE LIKE

[75] Inventors: Mindert Kats; Hendrikus Bernardus Sleumer, both of Drachten, Netherlands

[73] Assignee: U.S. Philips Corporation, New York, N.Y.

[21] Appl. No.: 672,132

[22] Filed: Mar. 31, 1976

[30] Foreign Application Priority Data

Apr. 15, 1975 Netherlands .......................... 7504441

[51] Int. Cl.² ............................................. A47J 31/10
[52] U.S. Cl. ......................................... 99/280; 99/320
[58] Field of Search .................................. 99/280–281, 99/279, 282, 285, 283, 300, 302, 320, 322, 319; 248/325, 364; 222/62, 67; 73/305, 403; 177/95, 207; 141/95, 135

[56] References Cited

U.S. PATENT DOCUMENTS

| 1,524,928 | 2/1925 | Hardel et al. .................. 177/207 |
| 2,209,831 | 7/1940 | Schurig ............................ 99/320 X |
| 2,661,201 | 12/1953 | Bowes ............................. 177/207 X |
| 2,846,938 | 8/1958 | Brandl ................................ 99/281 |
| 2,926,234 | 2/1960 | Palmer ............................. 99/281 X |
| 3,246,524 | 4/1966 | Shiba ............................... 177/207 X |
| 3,348,468 | 10/1967 | Eisendrath ....................... 99/285 X |

Primary Examiner—Harvey C. Hornsby
Assistant Examiner—Timothy Simone
Attorney, Agent, or Firm—Frank R. Trifari; Rolf E. Schneider

[57] ABSTRACT

An appliance for making coffee, having a water reservoir and a filtering device including a filter holder, is provided with a lever arrangement pivotally connecting the filter holder and a movable element responsive to the water level in the reservoir so that the desired ratio between the amounts of water and coffee is obtained.

5 Claims, 4 Drawing Figures

APPLIANCE FOR MAKING COFFEE AND THE LIKE

This invention relates to an appliance for making coffee and the like, which includes a water reservoir and a filtering device having a filter holder.

In order to obtain a good result the ratio between the amounts of water and the substance to be filtered is important. In appliances of the above-mentioned type it is known to provide an accessory measuring scoop by means of which for example the amount of ground coffee can be measured in accordance with the amount of water in the reservoir. However, in many instances this method is not sufficiently accurate.

Therefore it is an object of the invention to provide an appliance of the above-mentioned type in which in a simple manner the correct amount of substance to be filtered can be determined for any amount of water. According to the invention, there is provided an appliance for making coffee and the like, the appliance having a water reservoir and a filtering device including a filter holder, in which the filter holder is coupled to a movable element responsive to the level in the water reservoir.

The element may be in the form of a floating body or may be a movable vessel which communicates with the water reservoir.

Preferably, the filter holder is coupled to the element by a lever. The leverage ratio may be adjustable.

Advantageously, the system of filter holder and element is provided with indication means.

By way of example, the invention will be described in more detail with reference to the embodiments shown in the accompanying drawings.

Figure 2:
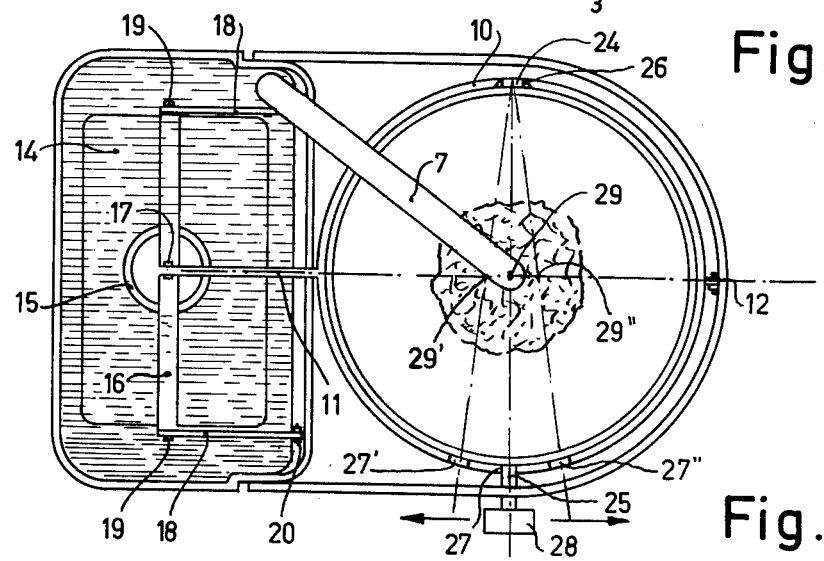
Figure 3:
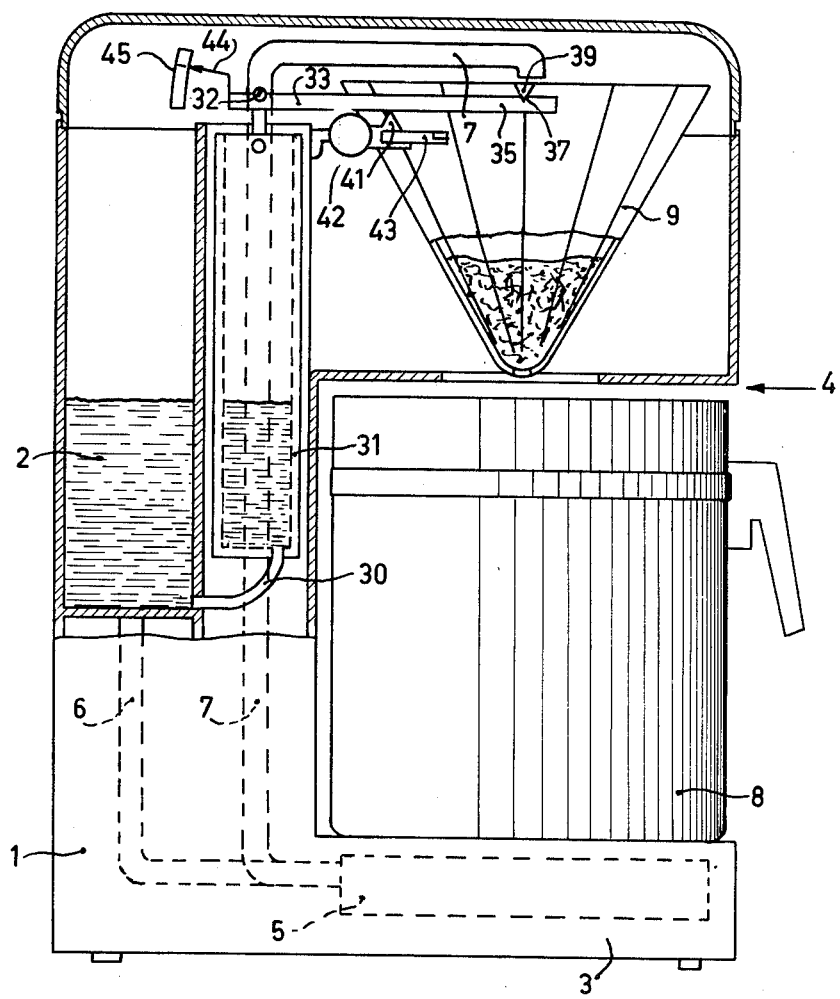
Figure 4:
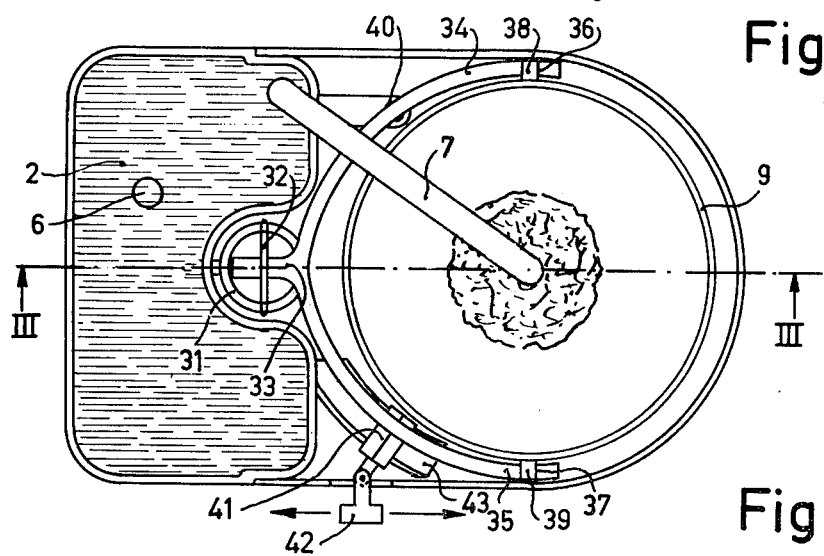

In the drawings:

FIG. 1 shows an appliance in accordance with the invention partly in elevation and partly with cut-away housing wall, FIG. 2 is a plan view of the appliance of FIG. 1 with the lid removed, FIG. 3 shows a different embodiment partly in elevation and partly in cross-section taken along the line III—III in FIG. 4, and FIG. 4 shows a plan view of the appliance of FIG. 3 with the lid removed.

In the two embodiments shown in FIGS. 1 to 4 the appliance comprises a housing 1 with a water reservoir 2, a base plate 3 and a filtering device 4. The base plate 3 accommodates a so-called flow heater 5. Water, which is supplied from the reservoir via the pipe 6, is heated by this flow heater 5 and conveyed to the filtering device 4 via the pipe 7. The filtering device comprises a receptacle 8 and a filter holder 9 for the ground coffee to be filtered.

In the embodiment of FIGS. 1 and 2 the filter holder 9 is supported from an annular portion 10 of a lever 11 which is pivoted to the housing 1 at point 12. At its opposite end, the lever 11 is attached to a float 13 which is located in the water reservoir 2. The float 13 comprises a box-shaped portion 14 and a cylindrical portion 15 and it also carries a bracket 16 to which the lever 11 is rotatably coupled at pivot 17. Two rods 18 which are rotatably connected to the bracket 16 at points 19 and are rotatably connected to the wall of the reservoir 2 at points 20 serve to prevent the float 13 from touching the wall of the reservoir 2 during vertical movements of the float. The end of the lever 11 near the pivot 17 carries a pointer 21, the lid 22, which forms the upper surface of the appliance, being provided with a corresponding index mark 23. The lid 22 is made of a transparent material, so that the pointer 21 and the mark 23 are visible without removal of the lid 22.

The filter holder 9 is provided with two diametrically opposed bearing cams 24 and 25 of triangular cross-section. The annular portion 10 of the lever 11 has corresponding grooves 26 and 27 on the upper surface thereof in which grooves the bearing cams 24 and 25 engage. On each side of the groove 27, additional grooves 27' and 27" are located in which the bearing cam 25 can alternatively be fitted if desired. For the purpose of moving the bearing cam 25, the outer end of the cam is provided with a knob 28. The groove 26 is sufficiently wide relative to the bearing cam 24 that the bearing cam 25 can optionally be fitted in one of the grooves 27, 27' and 27". Thus, the leverage ratio of the lever 11 can be varied slightly in respect of the forces exerted on it by the float 13 and the filter holder 9. The force which is exerted on the lever 11 by the float 13 is applied to point 17, whilst the resultant of the forces which are exerted on the lever 11 by the filter holder 9 are assumed to act on the imaginary point of application 29. The leverage ratio is therefore defined as the ratio of the distances between the pivot 12 and the points of application 17 and 29. Upon transfer of the bearing cam 25 to the groove 27' or 27" the imaginary point of application 29 is transferred to 29' or 29" respectively so that the leverage ratio will change accordingly.

The operation of such appliance is as follows. Depending on the amount of leverage desired, the water reservoir 2 is filled to a level which is for example visible on a vertical scale, not shown, on the wall of the reservoir. The float 13, which originally rests with the portion 14, at the bottom of the reservoir 2, is lifted by the water in the reservoir to a position in which the pointer 21 is above the mark 23. By for example, pouring ground coffee into the filter holder 9 the lever 11 can be returned until the pointer 21 is at the mark 23. The lever mechanism has been proportioned so that in this position of the lever a constant ratio is obtained between the amount of water in the reservoir and the amount of ground coffee in the filter holder for any water level between a minimum and a maximum level in the reservoir. A ratio of these amounts which proves to be satisfactory in practice is for example: 6 grams of coffee per hundred milliliters of water.

By changing the leverage ratio by movement of the knob 28, in the manner described above, the mechanism can be adjusted for a weaker or stronger brew, for example five or seven grams of coffee per hundred milliliters of water.

The indicated construction of float 13 is preferred because it gives a suitably high water level in the reservoir for the smallest convenient quantity of water, that is the quantity required for making a single cup of coffee.

The levels for two or more cups, however, are located at comparatively short distances above the minimum water level, so that the difference in the deflection of the pointer 21 when the reservoir is being filled to the minimum or the maximum level is minimized.

Clearly, it is alternatively possible to use the pointer 21 as an indicating means for the strength of the brew. In the embodiment described above the positions of the pointer 21, may be indicated by graduations, a position below the mark 23 denoting a stronger brew, whereas a position with the pointer above the mark 23 denoting a weaker brew.

In the embodiment of FIGS. 3 and 4 the water reservoir 2 is coupled to an auxiliary reservoir 31 by a flexible connection 30 such as a rubber hose which auxiliary reservoir is suspended from an end of lever 33 by means of a bracket 32. The lever 33 is substantially fork-shaped with legs 34 and 35 provided with grooves 36 and 37 in which the filter holder 9 is mounted as before with the aid of the bearing cams 38 and 39. The legs 34 and 35 of the lever 33 are positioned on a pair of knife-edge bearings 40 and 41, so that the lever is rotatable about the connection line of these knife-edge bearings 40 and 41. Knife-edge bearing 41 is provided with a knob 42 and is movable along a support 43, so that the leverage ratio is again adjustable. A deflection of the lever 33 can be detected with the aid of a pointer 44 at the end of the lever and a mark 45 on the lid which is made of a transparent material.

The mode of operation of the appliance of FIGS. 3 and 4 is similar to that already described.

The force which is exerted on the lever 33 by the auxiliary reservoir 31 depends on the water level in the water reservoir 2. For each water level a constant ratio can be obtained between the amount of water in the water reservoir 2 and the amount of ground coffee in the filter holder 9, by pouring so much ground coffee in the filter holder 9 that the pointer 44 is at the mark 45. This ratio can be varied by moving the knife-edge bearing 41 along the support with the aid of the knob 42. Also in this case it is possible again to adjust the appliance for weaker or stronger brews with the aid of the pointer 44 instead of the control knob.

In the two embodiments described hereinbefore it is also possible to fill the filter holder first with ground coffee after which the water reservoir is filled to the corresponding level as indicated by the pointers 21 or 44.

The foregoing descriptions of embodiments of the invention have been given by way of example only and a number of modifications may be made without departing from the scope of the invention as defined in the appended claims. For example, it is not essential that the appliance should be used exclusively for making coffee and it might be used alternatively for making a different beverage, such as tea.

What is claimed is:

1. An appliance for making coffee and the like, which comprises a housing for a water reservoir and a filtering device including a filter holder, a movable element responsive to the level of the water in the water reservoir, and a lever pivotally supported by the housing and pivotally supporting the filter holder, one end of the lever being pivotally attached to the movable element, whereby a desired ratio between the amount of water in the water reservoir and the amount of substance in the filter holder to be filtered can be obtained.

2. An appliance according to claim 1, in which the movable element comprises a float in the water reservoir.

3. An appliance according to claim 1, in which the movable element comprises a separate vertically movable vessel in communication with the water reservoir.

4. An appliance according to claim 1, which includes means to adjust the leverage ratio and thereby the ratio between the amounts of water and the substance to be filtered.

5. An appliance according to claim 1, which includes means to indicate the ratio between the amounts of water and the substance to be filtered.

* * * * *